(12) United States Patent
Romero De La Osa

(10) Patent No.: US 10,399,388 B2
(45) Date of Patent: Sep. 3, 2019

(54) AIRCRAFT TIRE WITH SPECIFIED ZIGZAG WORKING REINFORCEMENT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Marc Romero De La Osa, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 214 days.

(21) Appl. No.: 15/126,011

(22) PCT Filed: Mar. 23, 2015

(86) PCT No.: PCT/EP2015/056054
§ 371 (c)(1),
(2) Date: Sep. 14, 2016

(87) PCT Pub. No.: WO2015/150133
PCT Pub. Date: Oct. 8, 2015

(65) Prior Publication Data
US 2018/0186191 A1    Jul. 5, 2018

(30) Foreign Application Priority Data
Mar. 31, 2014 (FR) ...................................... 14 52783

(51) Int. Cl.
*B60C 9/18*      (2006.01)
*B29D 30/30*     (2006.01)
(Continued)

(52) U.S. Cl.
CPC .......... *B60C 9/263* (2013.01); *B29D 30/3035* (2013.01); *B29D 30/70* (2013.01);
(Continued)

(58) Field of Classification Search
CPC ..... B60C 9/263; B60C 2009/266; B60C 9/28; B60C 2009/2035; B60C 2200/02;
(Continued)

(56) References Cited

U.S. PATENT DOCUMENTS 3,113,738 A * 12/1963 Vanzo ..................... B29D 30/70
                                                  156/117
5,427,167 A *  6/1995 Watanabe ............... B60C 9/263
                                                 152/533 X
(Continued)

FOREIGN PATENT DOCUMENTS

EP    0 540 303 B1    1/1996
EP    0 850 787       7/1998
(Continued)

OTHER PUBLICATIONS

English machine translation of JP 2003-211556 A, Jul. 29, 2003.*

*Primary Examiner* — Adrienne C. Johnstone
(74) *Attorney, Agent, or Firm* — Cozen O'Connor

(57) ABSTRACT

The working reinforcement (2) of an aircraft tire is made by the zigzag winding of a strip (5) having width W, with a periodic curve (7), corresponding to the mid-line of the strip, forming, with the circumferential direction (XX), a non-zero angle A. The circumferential distance (c) between the extrema ($S_{51}$, $S_{52}$, $S_{53}$) of the respective mid-lines of two consecutive strip portions (51, 52, 53) is equal to the ratio W/sin A. For any set of three consecutive strip portions (51, 52, 53), made up of a first, a second and a third portion, the respective mid-lines of the first and third strip portions (51, 53) intersect at an intersection point (I), axially aligned with
(Continued)

the extremum ($S_{52}$) of the mid-line of the second strip portion (52) and axially on the inside of said extremum ($S_{52}$) at an axial distance (a) at least equal to the width W.

6 Claims, 5 Drawing Sheets

(51) Int. Cl.
  *B29D 30/70* (2006.01)
  *B60C 9/26* (2006.01)
(52) U.S. Cl.
  CPC ............ *B60C 9/26* (2013.01); *B60C 2200/02* (2013.01); *Y10T 152/10783* (2015.01)
(58) Field of Classification Search
  CPC ........ Y10T 152/10783; B29D 30/1635; B29D 30/3035; B29D 30/70
  USPC .......................... 152/533; 156/117, 397, 906
  See application file for complete search history.

(56) References Cited

U.S. PATENT DOCUMENTS

| | | |
|---|---|---|
| 6,125,900 A | 10/2000 | De Loze De Plaisance et al. |
| 6,601,626 B2 | 8/2003 | Royer et al. |
| 7,905,265 B2 | 3/2011 | Roget et al. |

FOREIGN PATENT DOCUMENTS

| | | | | |
|---|---|---|---|---|
| EP | 1 163 120 | | 1/2003 | |
| EP | 1 518 666 B1 | | 3/2005 | |
| EP | 1 381 525 B1 | | 2/2006 | |
| FR | 1 268 334 | | 6/1961 | |
| JP | H 11 34609 | | 2/1999 | |
| JP | 2003211556 A | * | 7/2003 | ............. B60C 9/263 |
| JP | 3 644728 B2 | | 5/2005 | |

* cited by examiner

AIRCRAFT TIRE WITH SPECIFIED ZIGZAG WORKING REINFORCEMENT

This is a U.S. National Phase Application under 35 USC 371 of International Application PCT/EP2015/056054 filed on Mar. 23, 2015 which claimed the priority of French application no. 1452783 filed Mar. 31, 2014.

FIELD OF THE INVENTION

The present invention relates to an aircraft tire and, in particular, to a crown reinforcement of an aircraft tire.

BACKGROUND OF THE INVENTION

In the following text, the circumferential, axial and radial directions denote a direction tangential to the tread surface of the tire in the direction of rotation of the tire, a direction parallel to the axis of rotation of the tire and a direction perpendicular to the axis of rotation of the tire, respectively. "Radially on the inside or, respectively, radially on the outside" means "closer to or, respectively, further away from the axis of rotation of the tire". "Axially on the inside or, respectively, axially on the outside" means "closer to or, respectively, further away from the equatorial plane of the tire", the equatorial plane of the tire being the plane that passes through the middle of the tread surface of the tire and is perpendicular to the axis of rotation of the tire.

In general, a tire comprises a tread, intended to come into contact with the ground via a tread surface, the tread being connected by two sidewalls to two beads, the two beads being intended to provide a mechanical connection between the tire and a rim on which the tire is mounted.

A radial aircraft tire more particularly comprises a radial carcass reinforcement and a crown reinforcement, both as described, for example, in document EP 1381525.

The radial carcass reinforcement is the tire reinforcing structure that connects the two beads of the tire. The radial carcass reinforcement of an aircraft tire generally comprises at least one carcass layer, each carcass layer being made up of reinforcers, usually textile, coated in a polymeric material of the elastomer or elastomer compound type, the reinforcers being mutually parallel and forming, with the circumferential direction, an angle of between 80° and 100°.

The crown reinforcement is the tire reinforcing structure radially on the inside of the tread and at least partially radially on the outside of the radial carcass reinforcement. The crown reinforcement of an aircraft tire generally comprises at least one crown layer, each crown layer being made up of mutually parallel reinforcers coated in a polymeric material of the elastomer or elastomer compound type. Among the crown layers, a distinction is usually made between the working layers that constitute the working reinforcement, usually made up of textile reinforcers, and the protective layers that constitute the protective reinforcement, made up of metal or textile reinforcers and arranged radially on the outside of the working reinforcement. The working reinforcement dictates the overall mechanical behaviour of the crown reinforcement, while the protective reinforcement essentially protects the working layers from attack likely to spread through the tread radially towards the inside of the tire.

The textile reinforcers of the carcass layers and of the crown layers are usually cords made of spun textile filaments, preferably made of aliphatic polyamide or of aromatic polyamide. The mechanical properties under tension, such as the elastic modulus, the elongation at break and the force at break of the textile reinforcers, are measured after prior conditioning. "Prior conditioning" means the storage of the textile reinforcers for at least 24 hours, prior to measurement, in a standard atmosphere in accordance with European Standard DIN EN 20139 (temperature of 20±2° C.; relative humidity of 65±2%). The measurements are taken in the known way using a ZWICK GmbH & Co (Germany) tensile test machine of type 1435 or type 1445. The textile reinforcers are subjected to tension over an initial length of 400 mm at a nominal rate of 200 mm/min. All the results are averaged over 10 measurements.

During the manufacture of an aircraft tire and, more specifically, during the step of laying the working reinforcement, a working layer is usually obtained by circumferential zigzag winding or by a circumferential winding in turns of a strip onto a cylindrical laying surface having as its axis of revolution the axis of rotation of the tire. The strip is generally made up of at least one continuous textile reinforcer coated in an elastomeric compound and, usually, of a juxtaposition of mutually parallel textile reinforcers. Whether produced by circumferential zigzag winding or circumferential winding in turns, the working layer is then made up of the juxtaposition of portions of strip.

Circumferential winding in turns of a strip is understood as meaning a winding of the strip in the circumferential direction and in a helix of radius equal to the radius of the cylindrical laying surface and at a mean angle, with respect to the circumferential direction, of between 0° and 5°. The working layer thus obtained by winding in turns is said to be circumferential because the angle of the textile reinforcers of the strip, one parallel to the next, formed in the equatorial plane with the circumferential direction, is between 0° and 5°.

Circumferential zigzag winding of a strip is understood as meaning winding of the strip in the circumferential direction and with a periodic curve, that is to say a curve formed of periodic waves oscillating between extrema. Winding a strip with a periodic curve means that the mid-line of the strip, equidistant from the edges of the strip, coincides with the periodic curve. During circumferential zigzag winding of a strip, the working layers are laid in pairs, each pair of working layers constituting a working bi-ply. Thus, a working bi-ply is made up, in its main section, that is to say axially inside the axial ends thereof, of two radially superposed working layers. At its axial ends, a working bi-ply generally comprises more than two radially superposed working layers. The axial end portion of a working bi-ply comprising more than two radially superposed working layers is referred to as the axial end overthickness. This axial end overthickness is generated by the crossings of the strip, at the end of the working bi-ply, for each turn of zigzag winding. Such a working reinforcement comprising working bi-plies obtained by circumferential zigzag winding of a strip has been described in documents EP 0540303, EP 0850787, EP 1163120 and EP 1518666.

In the case of circumferential zigzag winding, it is known that the axial end overthicknesses of the working bi-plies are particularly sensitive to the onset of endurance damage, such as cracks which may evolve into significant degradation of the working reinforcement and, therefore, lead to a reduction in the life of the tire. These cracks arise generally at the internal interfaces of the axial end overthickness, that is to say between the radially superposed working layers at said axial end overthickness. Thus, the higher the number of radially superposed working layers at the axial end overthickness, the greater the number of internal interfaces and, therefore, the greater the risk of cracking.

SUMMARY OF THE INVENTION

One object of the invention is to improve the endurance of the working reinforcement of an aircraft tire by reducing the sensitivity to the risk of cracking of the axial end overthicknesses of the working bi-plies that make up the working reinforcement.

This and other objects are attained in accordance with one aspect of the invention directed to an aircraft tire comprising:

a working reinforcement radially on the inside of a tread and radially on the outside of a carcass reinforcement, the working reinforcement comprising at least one working bi-ply made at least in part of two radially superposed working layers, each working layer being made up of a juxtaposition of portions of a strip of width W, the strip being wound in a zigzag, in the circumferential direction of the tire, onto a cylindrical laying surface of radius R, having as its axis of revolution the axis of rotation of the tire, and with a periodic curve, the periodic curve corresponding to the mid-line of the strip and forming, with the circumferential direction of the tire and in the equatorial plane of the tire, a non-zero angle A, two consecutive strip portions, having respective mid-lines comprising extrema, the circumferential distance between the extrema of the respective mid-lines of two consecutive strip portions being equal to the ratio W/sin A between the width W of the strip and the sine of the angle A, and, for any set of three consecutive strip portions, made up of a first, a second and a third strip portion having respective mid-lines comprising extrema, the respective mid-lines of the first and third strip portions intersect at an intersection point, axially aligned with the extremum of the mid-line of the second strip portion and axially on the inside of said extremum at an axial distance at least equal to the width W of the strip.

The working reinforcement of an aircraft tire of the prior art generally comprises at least one working bi-ply made at least in part of two radially superposed working layers, that is to say of two working layers in the main section, axially on the inside of the axial end overthicknesses, and more than two working layers at the axial end overthicknesses.

The working bi-ply is generally made by the circumferential zigzag winding of a strip of width W onto a cylindrical laying surface of radius R, having as its axis of revolution the axis of rotation of the tire, with a periodic curve. More specifically, the working bi-ply is made by the winding of a number N of periods of circumferential length P of the periodic curve over a number T of winding turns, that is to say a number T of circumferences 2ΠR of the cylindrical laying surface of radius R, this being expressed by the relationship N*P=T*2ΠR.

Each working layer is thus made up of a juxtaposition of portions of a strip of width W, in the circumferential direction of the tire. Two consecutive strip portions are juxtaposed in the circumferential direction, that is to say in contiguous contact with one another. In other words, two consecutive strip portions are neither separated nor partially superposed. Their respective mid-lines are borne by the periodic curve with which the strip is wound, and thus have extrema which correspond to the axial ends of the working layer.

According to an embodiment of the invention, the circumferential distance between the extrema of the respective mid-lines of two consecutive strip portions is equal to the ratio W/sin A between the width W of the strip and the sine of the angle A, that is to say to the width of the strip projected in the circumferential direction of the tire. Specifically, the strip has a width W measured perpendicularly to its mid-line, said mid-line forming an angle A with the circumferential direction of the tire and in the equatorial plane of the tire. This geometric feature implies that two consecutive strip portions are adjacent and contiguous.

Also according to an embodiment of the invention, for any set of three consecutive strip portions, made up of a first, a second and a third strip portion having respective mid-lines comprising extrema, the respective mid-lines of the first and third strip portions intersect at an intersection point, axially aligned with the extremum of the mid-line of the second strip portion and axially on the inside of said extremum at an axial distance at least equal to the width W of the strip. This geometric feature ensures that the maximum number of radially superposed strip portions at the axial ends of the working bi-ply is equal to two. As a result, the maximum number of radially superposed working layers at the axial ends of the working bi-ply is equal to two, as in the main section, that it is to say there is no axial end overthickness. In other words, the working bi-ply comprises two radially superposed working layers across its entire axial width, without any axial end overthickness. Consequently, compared with a prior art tire comprising axial end overthicknesses, the number of internal interfaces between working layers is lower at the axial ends of the working bi-ply, and the risk of cracking is lower and the endurance of the crown reinforcement is improved.

The intersection point between the respective mid-lines of the first and third strip portions is positioned axially on the inside of the extremum of the mid-line of the second strip portion at an axial distance at most equal to twice the width W of the strip. At the axial end of the working bi-ply, on account of the changes in direction of the path of the strip, the stiffness of the working bi-ply is different from the stiffness of the working bi-ply in the main section, which is constant since it is dependent on the constant angle A. This feature thus makes it possible to limit the axial width of the axial end section in which the stiffness varies and thus to maximize the portion of working bi-ply with constant stiffness.

In one particular embodiment, in which the periodic curve, which bears the mid-line of any strip portion, comprises, at its extrema, a concave circular portion of radius $R_1$, the intersection point between the respective mid-lines of the first and third strip portions is advantageously positioned axially on the inside of the extremum of the mid-line of the second strip portion at an axial distance equal to $R_1*(1-\cos B)$ with $B = a\sin((W/\sin A)/R_1)$. A concave circular portion of radius $R_1$ is such that the centre of the circle of radius $R_1$ is axially on the inside of the extremum. B represents the angle at the centre, formed by the two straight lines passing through the centre of the concave circular portion and respectively through the extremum of the mid-line of the first strip portion and through the intersection point between the respective mid-lines of the first and third strip portions. In this particular case, the axial distance $R_1*(1-\cos B)$ with $B = a\sin((W/\sin A)/R_1)$ should at least be equal to the width W of the strip.

The ratio $R_1/W$ between the radius $R_1$ of the concave circular portion of the periodic curve and the width W of the strip is advantageously at least equal to 10. In other words, the radius of curvature $R_1$ should be large enough compared with the width W of the strip. This minimum value makes it possible to avoid the risk of the strip buckling outside its plane while the strip is being laid during manufacture, during the changes in direction at the extrema of the periodic curve.

According to a preferred embodiment, any portion of the periodic curve, extending axially inwards from one extremum of the periodic curve to a point on the equatorial plane of the tire, comprises a first, concave circular portion of radius $R_1$, extending axially inwards from the extremum to a second, convex circular portion of radius $R_2$, the second, convex circular portion extending axially inwards to a third, rectilinear portion forming an angle A with the circumferential direction, the third, rectilinear portion extending axially inwards to the point on the equatorial plane of the tire. The portion of the periodic curve, made up of all of the first, second and third portions described above, corresponds to a quarter period of the periodic curve. This quarter period of the periodic curve thus comprises, from the extremum to the equatorial plane, a concave circular portion, joined to a convex circular portion, that is to say one that is inverted compared with the preceding circular portion, this convex circular portion being joined to a rectilinear portion forming an angle A with the equatorial plane. The centre of curvature of the convex circular portion is axially outside the periodic curve. The periodic curve is thus said to have, at each extremum, a double curvature, that is to say a concave curvature followed by a convex curvature.

The radius $R_2$ of the second, convex circular portion of the periodic curve is advantageously equal to the radius $R_1$ of the first, concave circular portion of the periodic curve. This feature makes it possible to simultaneously optimize the ratios $R_1/W$ and $R_2/W$.

The angle A formed by the periodic curve with the circumferential direction of the tire and in the equatorial plane of the tire is more advantageously at least equal to 5°. A minimum angle A of 5° ensures a minimum cornering stiffness for the tire.

The angle A formed by the periodic curve with the circumferential direction of the tire and in the equatorial plane of the tire is also advantageously at most equal to 20°. Above an angle A equal to 20°, the cornering stiffness of the aircraft tire becomes too high for the desired performance.

The width W of the strip is advantageously at least equal to 2 mm, preferably at least equal to 6 mm. A minimum value of strip width is necessary both for the technological feasibility of the strip and for the productivity of the laying of the strip. Moreover, the nearer the strip width is to this minimum value, the more the radius of curvature $R_1$ at the axial end of the working bi-ply can be reduced, thereby in particular making it possible to reduce the axial width of the axial end of the working bi-ply, the stiffness of which is different from that in the main section of the working bi-ply.

The width W of the strip is further advantageously at most equal to 20 mm, preferably at most equal to 14 mm. A maximum value of strip width makes it possible to reduce the number of turns over which the strip is laid in a zigzag that are needed to create the working bi-ply, thereby reducing the time needed to create the working bi-ply and therefore increasing productivity.

The strip being made up of reinforcers coated in an elastomeric compound, according to a first variant embodiment, the strip comprises reinforcers made of a textile material, preferably of an aliphatic polyamide. Specifically, textile reinforcers, particularly made of aliphatic polyamide such as nylon, have a relatively low mass compared with metal reinforcers, thereby allowing a significant saving on the mass of the tire and therefore a gain in the payload that the aircraft can carry.

The strip being made up of reinforcers coated in an elastomeric compound, according to a second variant embodiment, the strip comprises reinforcers made of an aromatic polyamide. Specifically, reinforcers made of aromatic polyamide, such as aramid, make it possible to achieve a good compromise between high mechanical strength and low weight.

The strip being made up of reinforcers coated in an elastomeric compound, according to a third variant embodiment, the strip comprises hybrid reinforcers made of a combination of an aliphatic polyamide and an aromatic polyamide. Such reinforcers are generally referred to as hybrid reinforcers and offer the technical advantages of nylon and of aramid: high mechanical strength, high tensile deformability and low weight.

Another aspect of the invention relates to a method for manufacturing an aircraft tire, comprising a step of manufacturing the working bi-ply, wherein the working bi-ply is obtained by the circumferential zigzag winding of a strip of width W onto a cylindrical laying surface of radius R, having as its axis of revolution the axis of rotation of the tire, with a periodic curve. The periodic curve forms, with the circumferential direction of the tire and in the equatorial plane of the tire, a non-zero angle A, and comprises extrema. According to the invention, two consecutive strip portions having respective mid-lines comprising extrema, the circumferential distance between the extrema of the respective mid-lines of two consecutive strip portions is equal to the ratio W/sin A between the width W of the strip and the sine of the angle A, and, for any set of three consecutive strip portions, made up of a first, a second and a third portion having respective mid-lines comprising extrema, the respective mid-lines of the first and third strip portions intersect at an intersection point, axially aligned with the extremum of the mid-line of the second strip portion and axially on the inside of said extremum at an axial distance at least equal to the width W of the strip.

BRIEF DESCRIPTION OF THE DRAWINGS

The features and other advantages of the invention will be better understood with the aid of the following FIGS. 1 to 5, which have not been drawn to scale.

DETAILED DESCRIPTION OF THE DRAWINGS

Figure 1:
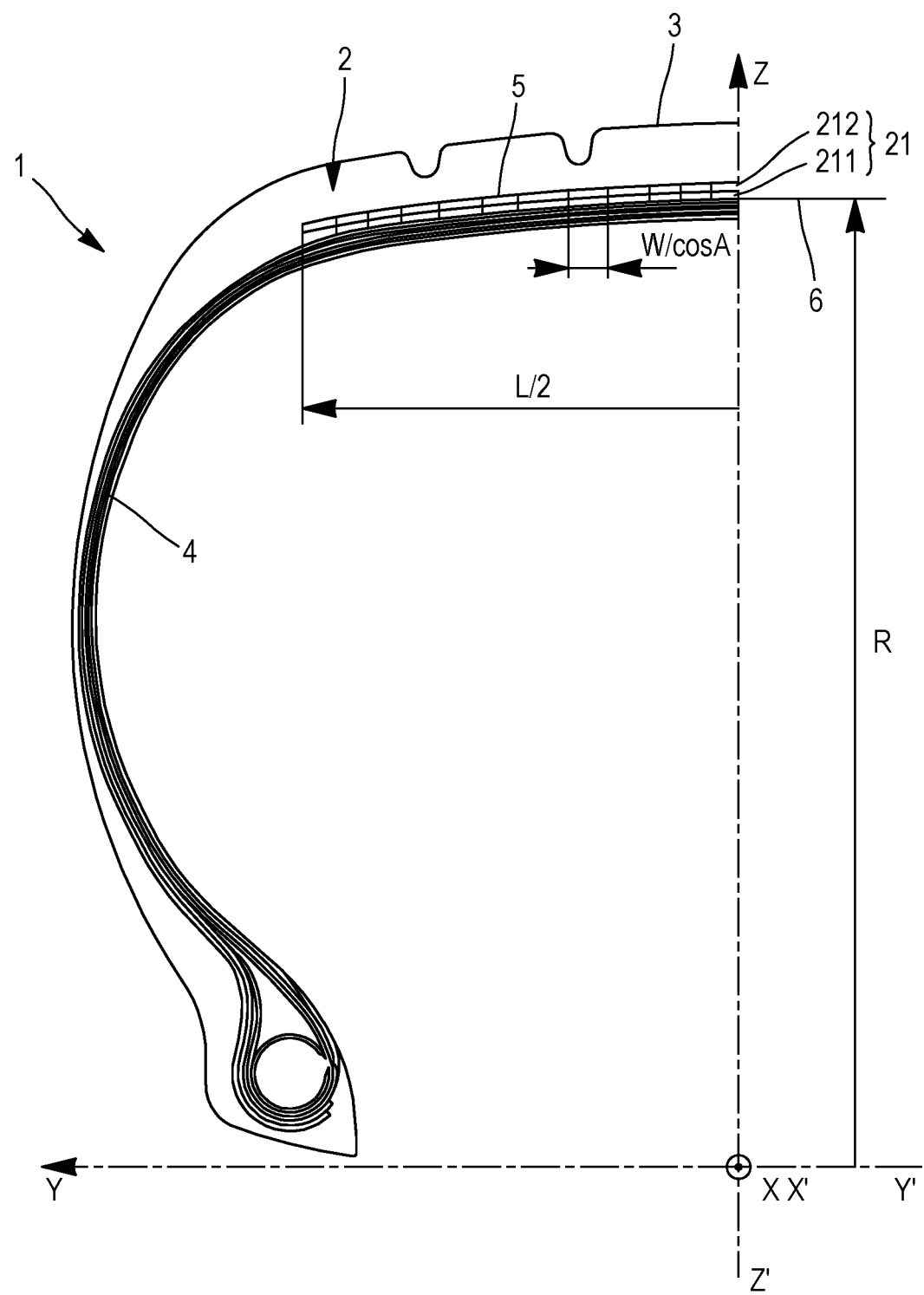
FIG. 1: a half-view in section of an aircraft tire according to an embodiment of the invention, in a radial plane (YZ) passing through the axis of rotation of the tire.

FIG. 1 shows a half-view in section, in a radial plane (YZ), of a prior art aircraft tire 1, comprising a working reinforcement 2 radially on the inside of a tread 3 and radially on the outside of a carcass reinforcement 4. In the example shown, the working reinforcement 2 comprises a working bi-ply 21 made up of two radially superposed working layers (211, 212) and obtained by circumferential zigzag winding (see FIG. 2) of a strip of width W onto a cylindrical laying surface 6 of radius R, having as its axis of revolution the axis of rotation (YY') of the tire. The axial end overthicknesses of the working bi-ply 21 are not shown for the sake of simplicity. In a radial plane, each working layer (211, 212) is made up of an axial juxtaposition of strip portions 5 of width W/cos A, where W is the width of the strip 5, measured perpendicularly to its mid-line, and A is the angle (see FIG. 3) formed by the mid-line of the strip 5 with the circumferential direction (XX') in the equatorial plane (XZ). Since the width of the working bi-ply is equal to L, its half-width L/2 is shown in FIG. 1.

Figure 2:
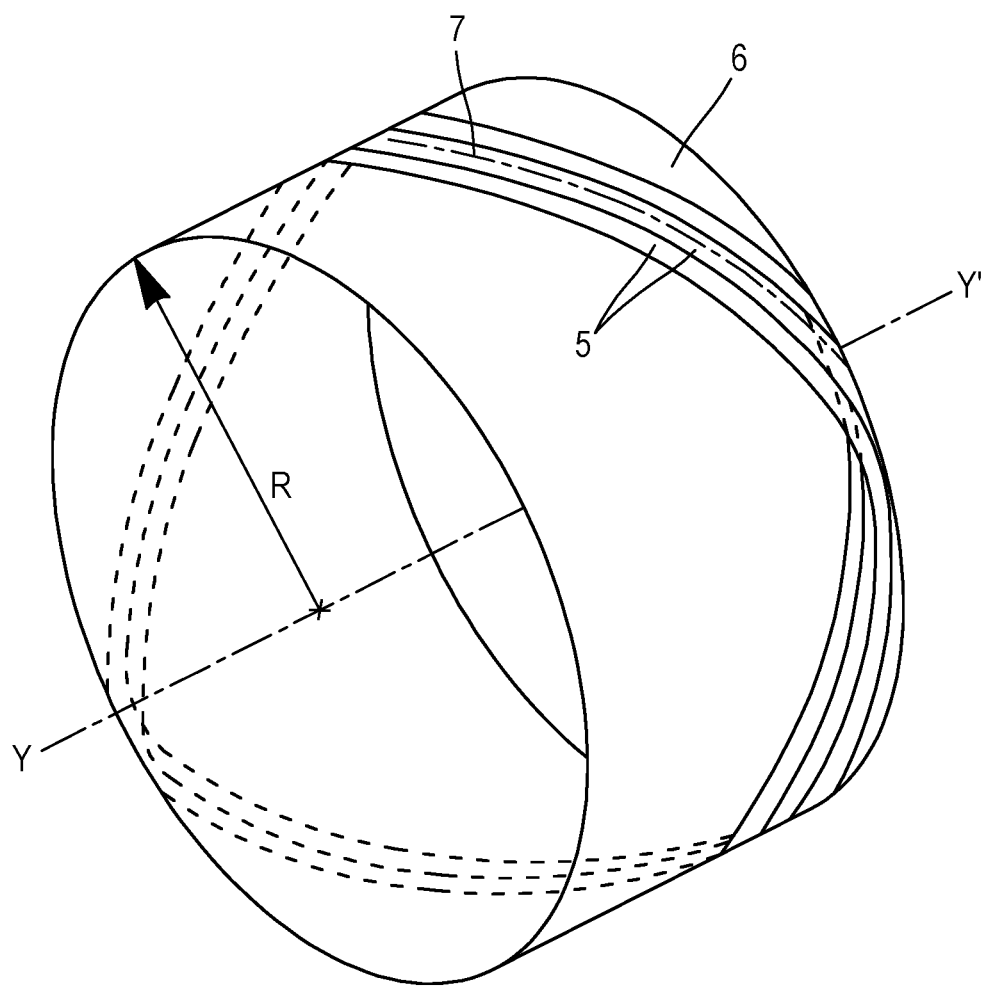
FIG. 2: a perspective view of a strip that makes up a working bi-ply of a prior art tire, wound circumferentially in a zigzag, with a periodic curve, onto a cylindrical laying surface.

FIG. 2 is a perspective view of a strip 5 that makes up a working bi-ply of a prior art tire, wound circumferentially in a zigzag, with a periodic curve 7, onto a cylindrical laying surface 6, which is rotationally symmetrical about an axis of rotation (YY') of the tire, having a radius R. Only three winding turns of the strip 5 are shown in FIG. 2, that is to say one working layer in the course of being produced.

Figure 3:
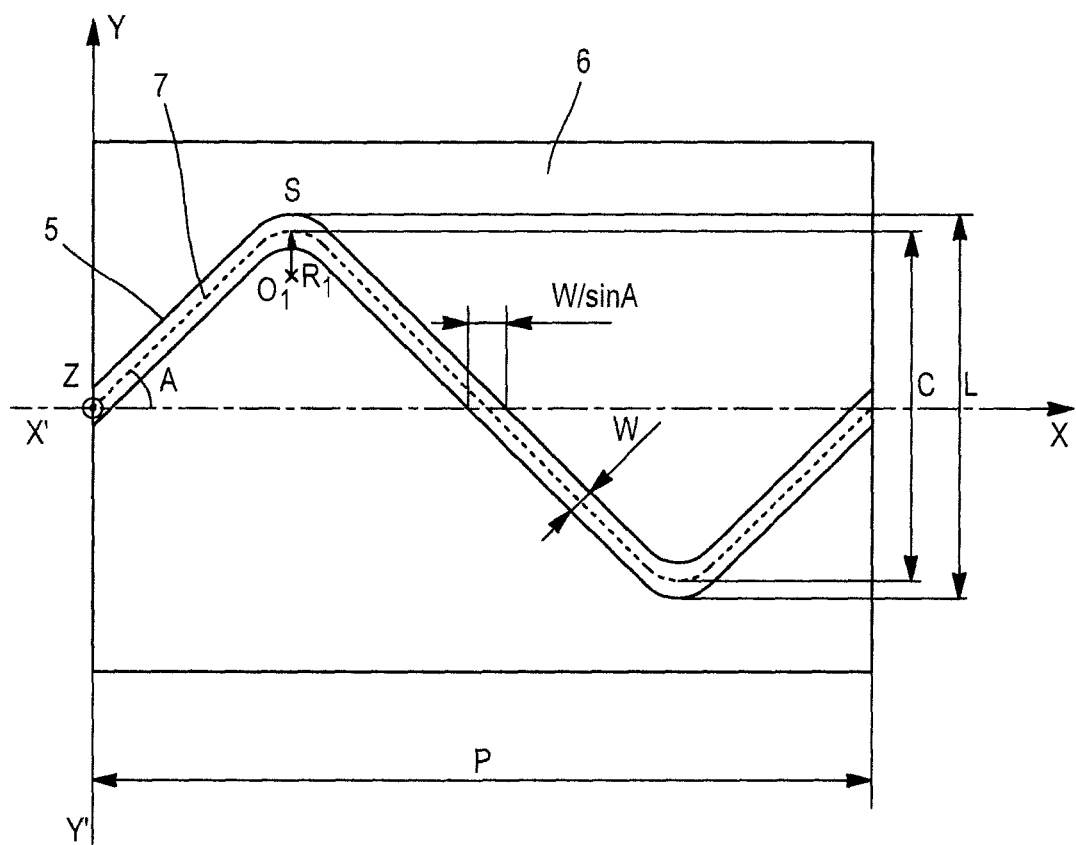
FIG. 3: a developed view of a strip that makes up a working bi-ply of a prior art tire, wound circumferentially in a zigzag, with a periodic curve, after the laying of one period.

FIG. 3 is a developed view of a strip 5 wound circumferentially in a zigzag, with a periodic curve 7, after the laying of one period, in the case of a prior art tire. The strip 5 is laid on a cylindrical surface 6 of circumference 2ΠR, shown in a developed form in FIG. 3. The mid-line of the strip 5 follows a periodic curve 7, forming an angle A with the circumferential direction XX'. The strip 5 has a width W measured perpendicularly to the mid-line of the strip that is borne by the periodic curve 7. It also comprises extrema S characterized by a radius of curvature $R_1$. At S, the curvature is referred to as concave, since the centre of curvature $O_1$ is axially on the inside of the extremum S. The periodic curve 7 has a period P equal to the circumference 2ΠR plus or minus W/sin A, where W/sin A is the width of the strip 5 projected in the circumferential direction XX'. Moreover, the periodic curve 7 has an amplitude C which, increased by the width W of the strip, defines the width L=C+W of the working bi-ply.

Figure 4:
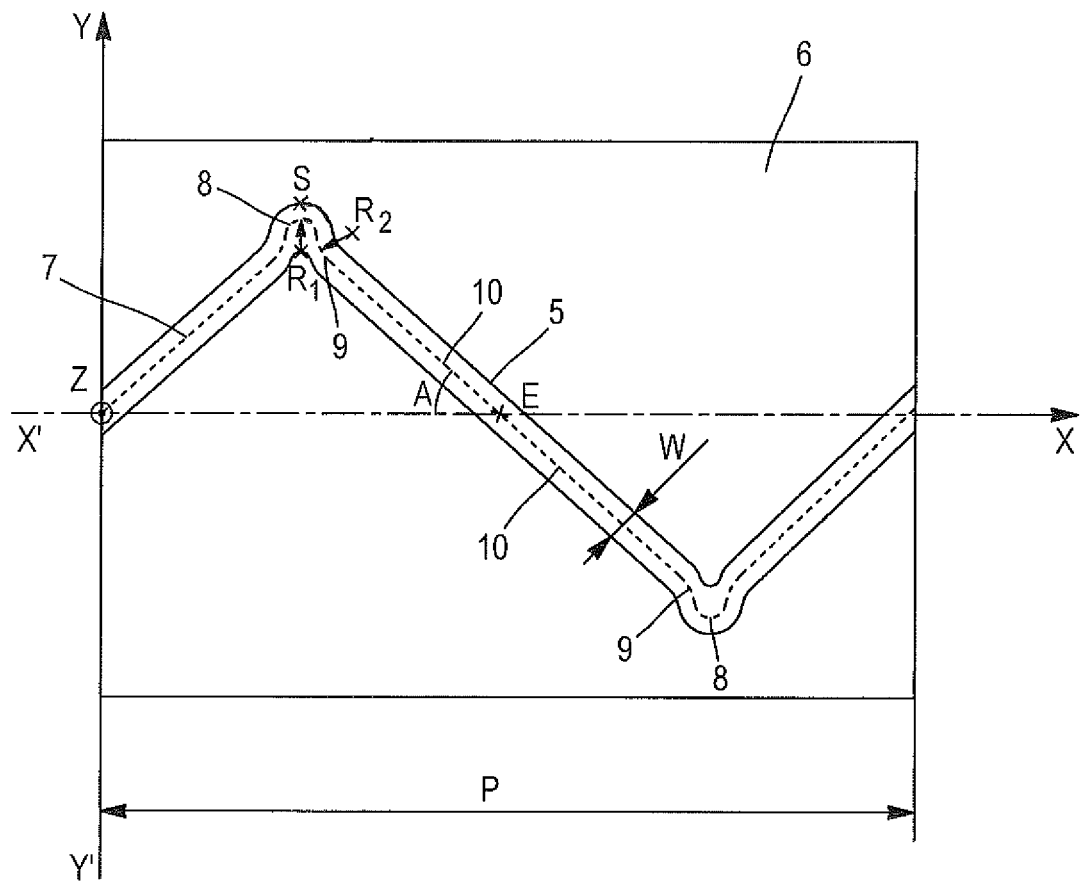
FIG. 4: a developed view of a strip that makes up a working bi-ply of a tire according to the invention, wound circumferentially in a zigzag, with a periodic curve, after the laying of one period.

FIG. 4 is a developed view of a strip 5 wound circumferentially in a zigzag, with a periodic curve 7, after the laying of one period, in the case of a tire according to the invention. The strip 5 is laid on a cylindrical surface 6 of circumference 2Π8, shown in a developed form in FIG. 3. The mid-line of the strip 5 follows a periodic curve 7, forming an angle A with the circumferential direction XX'. The strip 5 has a width W measured perpendicularly to the mid-line of the strip that is borne by the periodic curve 7. The strip is such that any portion of the periodic curve 7, extending axially inwards from one extremum S of the periodic curve 7 to a point E on the equatorial plane XZ of the tire, comprises a first, concave circular portion 8 of radius $R_1$, extending axially inwards from the extremum S to a second, convex circular portion 9 of radius $R_2$, the second, convex circular portion 9 of radius $R_2$ extending axially inwards to a third, rectilinear portion 10 forming an angle A with the circumferential direction XX', the third, rectilinear portion 10 extending axially inwards to the point E on the equatorial plane XZ of the tire. The first circular portion 8 of radius $R_1$ is concave since the centre $O_1$ (see FIG. 5) is axially on the inside of the periodic curve 7. The second circular portion 9 of radius $R_2$ is convex since the centre $O_2$ (see FIG. 5) is axially on the outside of the periodic curve 7.

Figure 5:
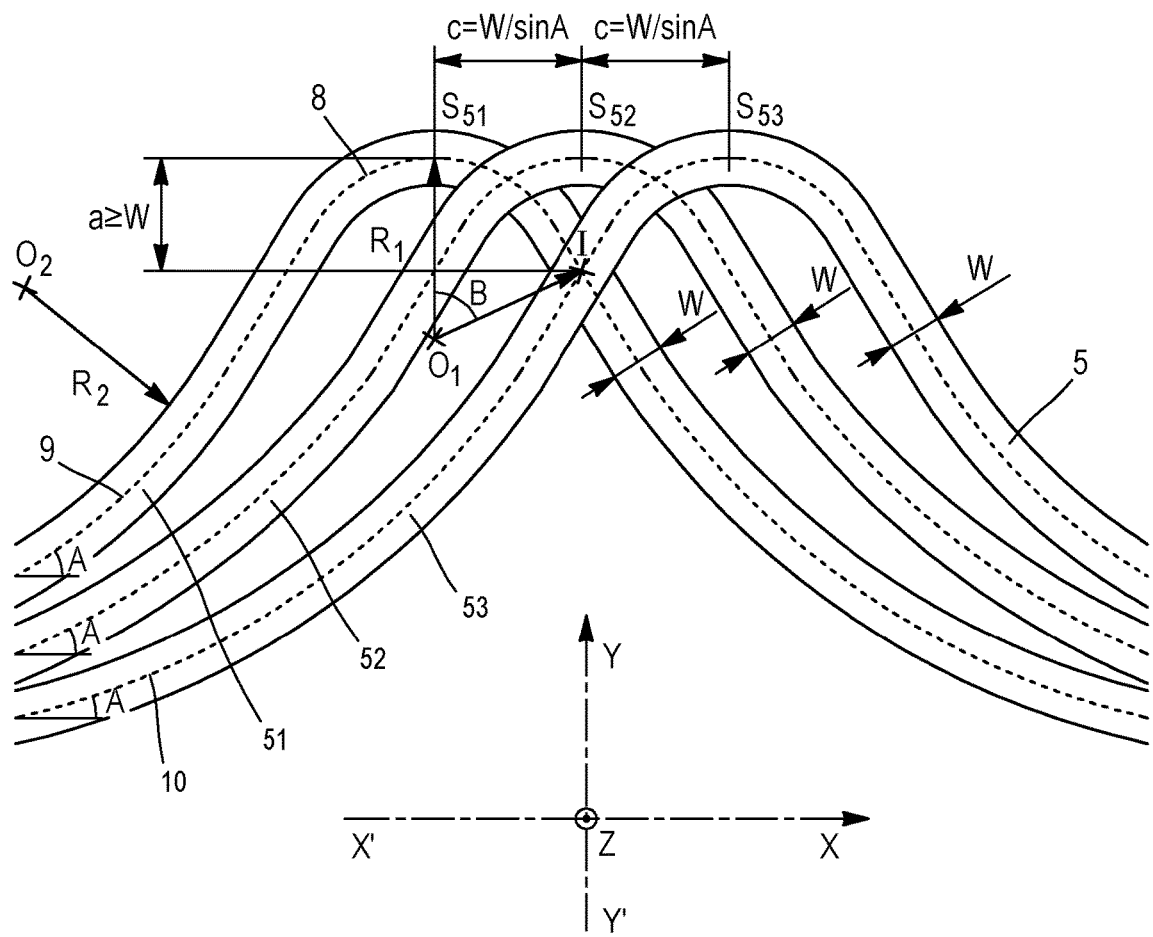
FIG. 5: a detail view of an axial end section of a tire according to an embodiment of the invention, having a set of three consecutive strip portions.

FIG. 5 shows an axial end section of a tire according to the invention. It has more particularly a set of three consecutive strip portions (51, 52, 53) made up of a first, a second and a third portion having respective mid-lines comprising extrema ($S_{51}$, $S_{52}$, $S_{53}$). The respective mid-lines of each of the strip portions comprises a first, concave circular portion 8 of radius $R_1$ and centre $O_1$, a second, convex circular portion 9 of radius $R_2$ and centre $O_2$, and a third, rectilinear portion 10 forming an angle A with the circumferential direction XX'. The circumferential distance c between the extrema ($S_{51}$, $S_{52}$, $S_{53}$) of the respective mid-lines of two consecutive strip portions (51, 52, 53) is equal to the ratio W/sin A between the width W of the strip 5 and the sine of the angle A. The respective mid-lines of the first and third strip portions (51, 53) intersect at an intersection point (I), axially aligned with the extremum $S_{52}$ of the mid-line of the second strip portion 52 and axially on the inside of said extremum $S_{52}$ at an axial distance a at least equal to the width W of the strip 5. In the preferred embodiment shown in FIG. 5, the periodic curve 7 comprising, at its extrema ($S_{51}$, $S_{52}$, $S_{53}$), a circular portion 8 of radius $R_1$, the intersection point I between the respective mid-lines of the first and third strip portions (51, 53) is positioned axially on the inside of the extremum $S_{52}$ of the mid-line of the second strip portion 52 at an axial distance a equal to $R_1*(1-\cos B)$ with B=a sin((W/sin A)/$R_1$). FIG. 5 is not drawn to scale: the three consecutive strip portions are contiguous in the main section and their respective axial ends comprise smaller gaps between one another than those shown in FIG. 5.

The inventors have produced the invention for an aircraft tire of size 1400×530 R 23, of which the working reinforcement comprises three superposed bi-plies, respectively radially from the inside to the outside, BF1, BF2 and BF3, the geometrical features and laying characteristics of which are presented in the following Table 1:

TABLE 1

| Working bi-ply | BF1 | BF2 | BF3 |
|---|---|---|---|
| Axial width L (mm) | 390 mm | 370 mm | 350 mm |
| Strip width W (mm) | 11.3 mm | 11.3 mm | 11.3 mm |
| Angle A (°) | 9.1° | 9.05° | 9.0° |
| Radius $R_1$ of the first, concave circular portion (mm) | 220 mm | 220 mm | 220 mm |
| Radius $R_2$ of the second, convex circular portion (mm) | 220 mm | 220 mm | 220 mm |
| Laying circumference 2ΠR (mm) | 4076 mm | 4096 mm | 4115 mm |
| Laying radius R (mm) | 649 mm | 652 mm | 655 mm |
| Laying circumference 2ΠR (mm) | 4076 mm | 4095 mm | 4113 mm |
| Number of periods N | 1 | 1 | 1 |
| Number of winding turns T | 58 | 58 | 58 |

Compared with that of a reference prior art tire, the crown reinforcement for an aircraft tire according to the invention suffers damage later and less seriously when the tire runs under harsh test conditions, such as those of the TSO (Technical Standard Order) test imposed by an FAA (Federal Aviation Administration) Standard.

The objective of the TSO test is to realize damage-free use cycle phases for the tire, tread separation of the tire, that is to say the loss of the tread, being allowed, however, during the final cycle, but not a loss of pressure.

The TSO test is a test, carried out on a rolling road, which is broken down into four phases:

50 aircraft takeoff cycles, in which the tire is subjected to the nominal pressure $P_v$ and to a load that varies between the nominal load $Z_n$, and 0.

8 aircraft taxiing cycles, in which the tire is subjected to the nominal pressure $P_v$, to the nominal load $Z_n$ and to a speed of around 65 km/h for about 10 700 m.

2 aircraft taxiing cycles, in which the tire is subjected to the nominal pressure $P_v$, to 1.2 times the nominal load $Z_n$ and to a speed of around 65 km/h for about 10 700 m.

1 overloaded aircraft takeoff cycle, in which the tire is subjected to the nominal pressure $P_v$ and to a load that varies between 1.5 times the nominal load $Z_n$ and 0.

This invention is applicable not only to any working bi-ply of the crown reinforcement of an aircraft tire, but also, more generally, to any bi-ply of the crown reinforcement, such as, for example, a protective bi-ply of the protective reinforcement.

It is also applicable to any tire comprising a crown reinforcement with at least one bi-ply obtained by zigzag winding of a strip, such as, for example and non-exhaustively, a tire for a metro train.

The invention claimed is:

1. An aircraft tire comprising:
   a working reinforcement radially on the inside of a tread and radially on the outside of a carcass reinforcement;
   the working reinforcement comprising at least one working bi-ply made at least in part of two radially superposed working layers;
   each working layer being made up of a juxtaposition of portions of a strip of width W;
   the strip being wound in a zigzag, in the circumferential direction of the tire, onto a cylindrical laying surface of radius R, having as its axis of revolution the axis of rotation of the tire, and with a periodic curve;
   the periodic curve corresponding to the mid-line of the strip and forming, with the circumferential direction of the tire and in the equatorial plane of the tire, a non-zero angle A; and
   two consecutive strip portions, each having respective mid-lines comprising extrema,
   wherein the circumferential distance (c) between the extrema of the respective mid-lines of the two consecutive strip portions is equal to the ratio W/sin A between the width W of the strip and the sine of the angle A, and
   wherein, for any set of three consecutive strip portions, made up of a first, a second and a third portion having respective mid-lines comprising extrema, the respective mid-lines of the first and third strip portions intersect at an intersection point, axially aligned with the extremum of the mid-line of the second strip portion and axially on the inside of said extremum at an axial distance (a) at least equal to the width W of the strip, and
   wherein any portion of the periodic curve, extending axially inwards from one extremum of the periodic curve to a point on the equatorial plane of the tire, comprises a first, concave circular portion of radius $R_1$, extending axially inwards from the extremum to a second, convex circular portion of radius $R_2$, the second, convex circular portion of radius $R_2$ extending axially inwards to a third, rectilinear portion forming an angle A with the circumferential direction, the third, rectilinear portion extending axially inwards to the point on the equatorial plane of the tire.

2. The aircraft tire according to claim 1, wherein the intersection point between the respective mid-lines of the first and third strip portions is positioned axially on the inside of the extremum of the mid-line of the second strip portion at an axial distance (a) at most equal to twice the width W of the strip.

3. The aircraft tire according to claim 1, wherein the intersection point between the respective mid-lines of the first and third strip portions is positioned axially on the inside of the extremum of the mid-line of the second strip portion at an axial distance (a) equal to $R_1*(1-\cos B)$ with $B=a\sin((W/\sin A)/R_1)$.

4. The aircraft tire according to claim 3, wherein the ratio $R_1/W$ between the radius $R_1$ of the concave circular portion of the periodic curve and the width W of the strip is at least equal to 10.

5. The aircraft tire according to claim 1, wherein the radius $R_2$ of the second, convex circular portion of the periodic curve is equal to the radius $R_1$ of the first, concave circular portion of the periodic curve.

6. A method for manufacturing an aircraft tire according to claim 1, comprising a step of manufacturing the at least one working bi-ply and a step of manufacturing the aircraft tire such that the working reinforcement comprises the manufactured at least one working bi-ply.

* * * * *